March 1, 1932.  C. W. MILLER  1,847,252
SHOCK EQUALIZER
Filed Oct. 22, 1929　　2 Sheets-Sheet 1
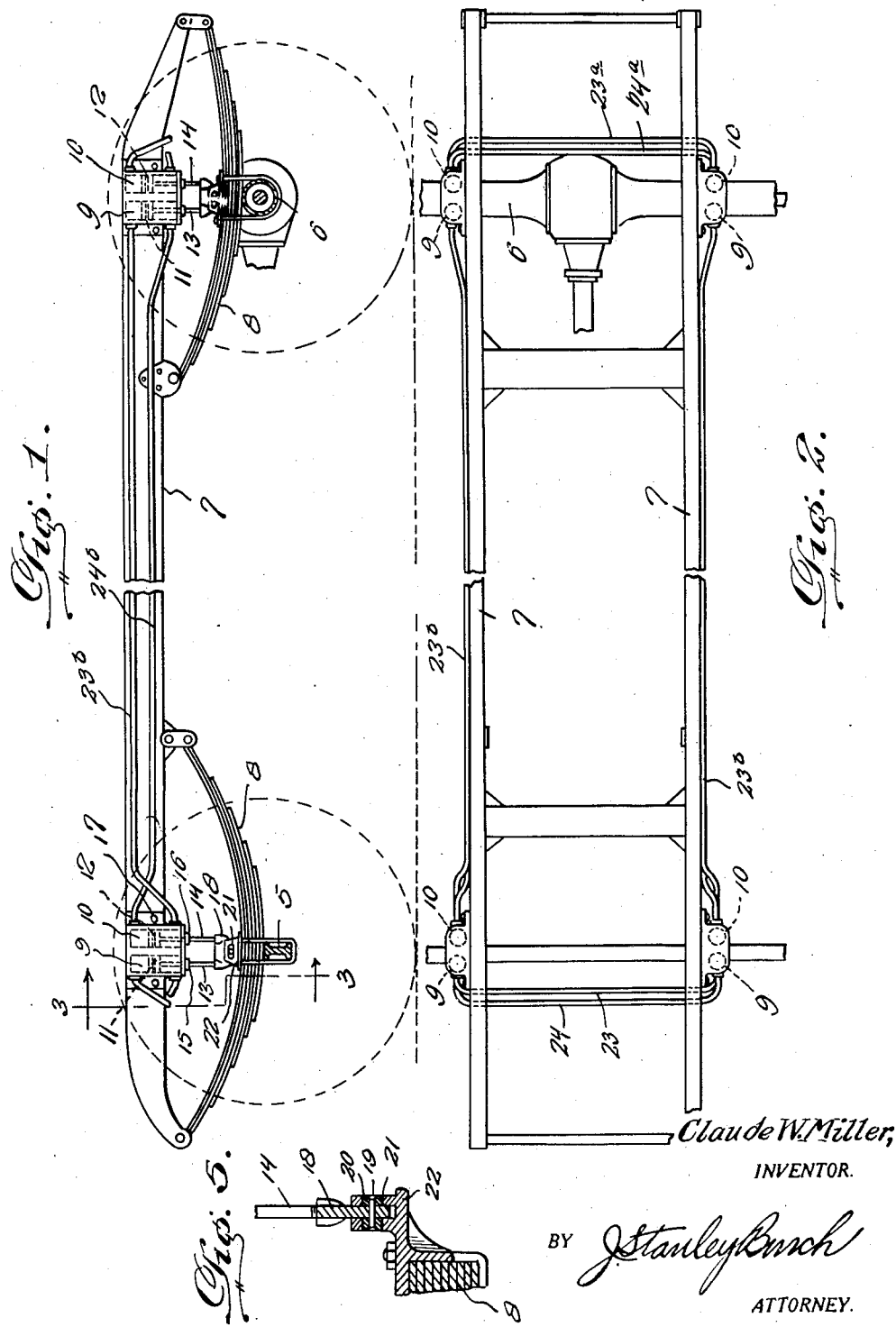
Claude W. Miller,
INVENTOR.
BY J Stanley Burch
ATTORNEY.

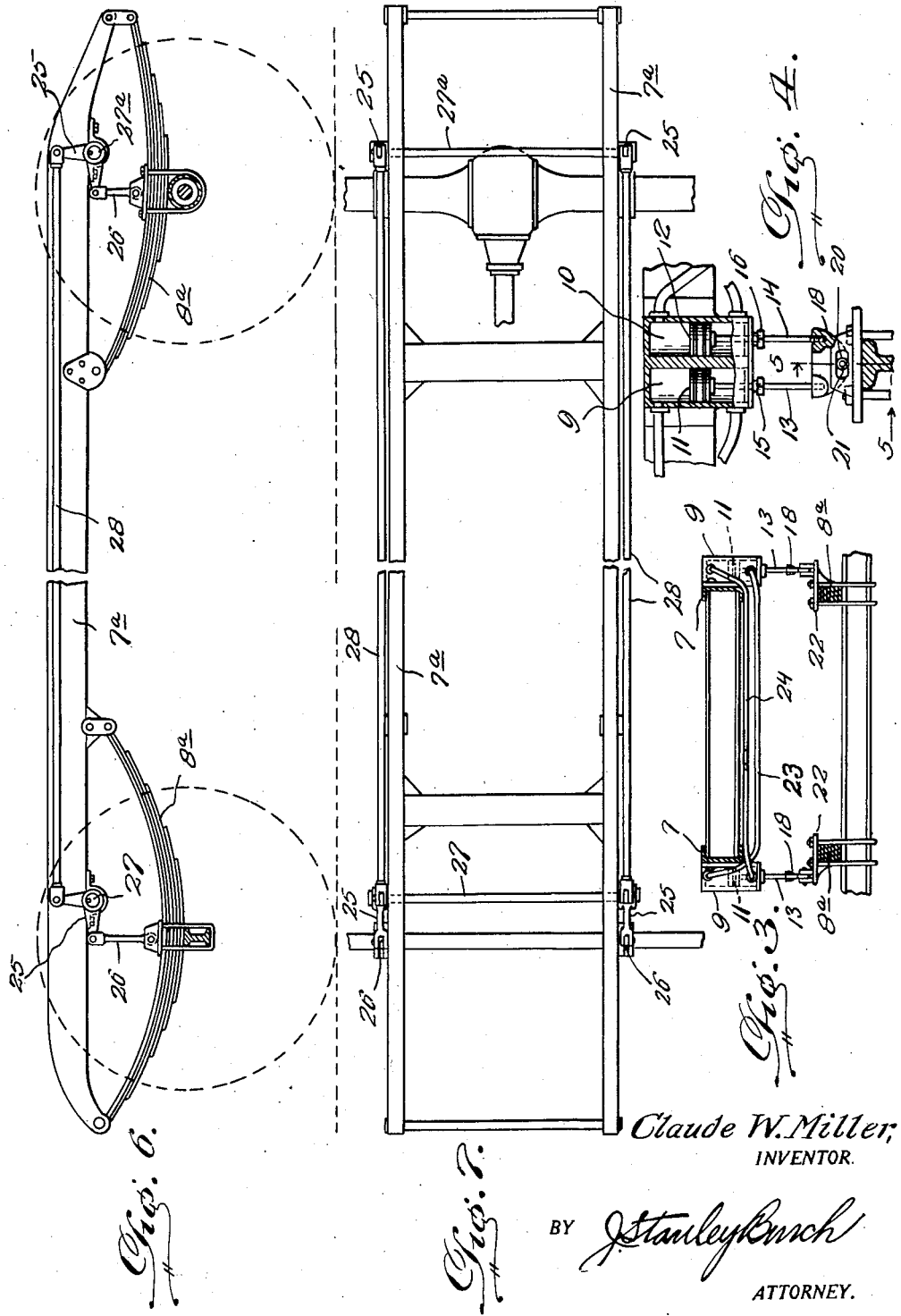

Patented Mar. 1, 1932

1,847,252

UNITED STATES PATENT OFFICE

CLAUDE WALTER MILLER, OF PENRYN, CALIFORNIA

SHOCK EQUALIZER

Application filed October 22, 1929. Serial No. 401,508.

This invention relates to improvements in shock equalizers for vehicles, such as automobiles, trucks, and the like.

The primary object of the present invention is to provide means whereby a shock delivered to any corner of a vehicle will be transmitted or equally distributed to all four corners of the vehicle so as to be uniformly taken up and absorbed by the four corner springs of the vehicle by which the vehicle frame is yieldingly mounted on the vehicle axles.

A further object of the invention is to provide a shock equalizing means of the above kind which is efficient in operation, practical in construction, and adapted to substantially eliminate both longitudinal rolling and side sway of the vehicle frame and vehicle body mounted thereon.

The invention consists of the novel form, combination and arrangement of parts hereinafter more fully described, shown in the accompanying drawings, and claimed.

In the drawings:

Figure 1 is a view, partly in side elevation, partly broken away, and partly in longitudinal section, showing a vehicle running gear equipped with a shock equalizer embodying the present invention.

Figure 2 is a top plan view of the construction shown in Figure 1.

Figure 3 is a vertical transverse section on line 3—3 of Figure 1.

Figure 4 is an enlarged fragmentary detail view, partly in side elevation, and partly broken away and in section, showing one of the four similar actuating units employed at the four corners of the vehicle as shown in Figures 1 and 2.

Figure 5 is an enlarged fragmentary section on line 5—5 of Figure 4.

Figure 6 is a view similar to Figure 1, showing a modified form of the invention; and Figure 7 is a top plan view of the construction shown in Figure 6.

Referring in detail to the drawings, 5 indicates the front axle and 6 the rear axle housing of a motor vehicle, upon which is yieldingly mounted the body-supporting or chassis frame 7 by means of the usual leaf springs 8 arranged at the four corners of the vehicle.

In accordance with the present invention, an actuating unit is mounted at each corner of the vehicle and operatively connected to the frame 7 and the adjacent vehicle spring 8 so as to be operated by relative vertical movement between the frame 7 and the adjacent axle 5 or axle housing 6, the units at each end of the vehicle being operatively connected and the units at each side of the vehicle being operatively connected, so that a shock delivered to and received by the vehicle spring at any corner of the vehicle will be similarly transmitted to the vehicle springs at all of the three remaining corners of the vehicle, thereby causing all of the springs to co-act in a similar manner for effectively taking up and absorbing the shock and eliminating longitudinal rolling or side sway of the vehicle frame.

In the form of the invention shown in Figures 1 to 5 inclusive, each actuating unit includes a pair of rigidly connected front and rear vertical cylinders 9 and 10 within which operate plungers 11 and 12 connected to depending piston rods 13 and 14 which work through packing glands 15 and 16 in the lower ends of the cylinders. When installed, each pair of cylinders and their piston rods are connected to opposing portions of the vehicle between which the shock is to be absorbed. For example, the cylinders may be secured to a side rail of the frame 7, and the pistons may be connected to the adjacent spring 8 directly above its point of attachment to the axle 5 or axle housing 6. As shown, the cylinders are rigidly bolted at 17 to the frame, while the lower ends of the piston rods are rigidly connected by a bar 18 having a cross pin 19 carrying rollers 20 engaging in longitudinal horizontal slots 21 of a bifurcated bracket 22 rigidly fastened on the adjacent spring 8. This allows free limited forward or rearward displacement of the axle or axle housing relative to the frame, as is obviously necessary.

The front cylinders 9 of the front units and the rear cylinders 10 of the rear units are interconnected so that the fluid therein can interchange between them. For this purpose, a pipe 23 connects the upper portion of the cylinder 9 of one front unit with the lower portion of the cylinder 9 of the other front unit, and another pipe 24 connects the lower portion of the first-mentioned cylinder 9 of the one front unit with the upper portion of the second-mentioned cylinder 9 of the other front unit. The rear cylinders 10 of the rear units are similarly connected by pipes 23a and 24a. As a result of this arrangement, upon forcing the piston of the cylinder 9 of either front unit upwardly, the fluid will be displaced from the upper portion of its said cylinder 9 into the lower portion of the companion cylinder 9 so as to raise the piston in the latter cylinder in harmony; and a contrary action will take place when either of the said pistons are drawn down. A like action takes place with respect to the rear cylinders 10 of the rear units and their pistons. In a like manner, the rear cylinder 10 of the front unit at each side of the frame 7 is connected to the front cylinder 9 of the rear unit at the same side of the frame, by means of pipes 23b and 24b. It thus appears that interconnections are provided by means of which the companion pistons are caused to move in unison so that the shock is distributed from any corner of the vehicle to the remaining three corners thereof. In this embodiment, the cylinders and pipes are either filled with oil or compressed air, and, due to the relatively small size of the pipes, the pistons operating in the cylinders form cushions or shock absorbers supplementing the action of the springs 8 in taking up and absorbing shocks. By employing cylinders arranged in pairs, the size of the individual cylinders and pistons may be so small as to facilitate ready installation of the units without interfering with or materially altering the standard construction of a vehicle and without danger of marring its appearance.

In the construction shown in Figures 6 and 7, each actuating unit includes a bell-crank lever 25 mounted at the corner of the vehicle frame 7a and having a forwardly projecting arm connected by means of a link 26 with the adjacent vehicle spring 8a, the other arm of the bell crank lever 25 projecting upwardly. The bell crank lever 25 of the front units are operatively connected by means of a rock shaft 27 journaled on and transversely of the frame 7a and on the ends of which the said bell-crank levers are secured. The bell crank levers 25 of the rear units are similarly carried and operatively connected by a further transverse rock shaft 27a journaled on the frame 7a. A connecting rod 28 operatively connects the upwardly projecting arms of the bell-crank levers 25 of the front and rear units at each side of the vehicle frame. In this embodiment, no shock absorbers are provided to supplement the action of the vehicle springs 8a in absorbing the shocks, but a shock delivered to the spring at any corner of the vehicle will be transmitted to the springs at the remaining three corners of the vehicle by the construction described, thereby causing the shock to be equally received and taken up by all four of the springs. Both forms of the invention provide for connecting the front units in pairs, the rear units in pairs and the front and rear units at each side of the vehicle in pairs, thereby substantially eliminating both longitudinal rolling and side sway tendencies of the vehicle frame.

Minor changes are contemplated within the spirit and scope of the invention as claimed.

What I claim as new is:

1. In a vehicle, in combination with the frame, axles, and suspension springs between the frame and axles at the four corners of the vehicle, means opposing longitudinal rolling and side sway movements of the frame comprising an actuating unit mounted at each front and rear corner of the vehicle, each actuating unit embodying a pair of fixed cylinders connected to the frame and co-operating double-acting pistons connected to the adjacent axle, means connecting the top and bottom ends of one cylinder of one front unit respectively with the bottom and top ends of one cylinder of the other front unit, means connecting the top and bottom end of one cylinder of one rear unit respectively with the bottom and top ends of one cylinder of the other rear unit, and means connecting the top and bottom of the other cylinder of each front unit respectively with the bottom and top of the other cylinder of the rear unit at the same side of the vehicle.

2. In a vehicle, in combination with the frame, axles, and suspension springs between the frame and axles at the four corners of the vehicle, means opposing longitudinal rolling and side sway movements of the frame, comprising an actuating unit mounted at each front and rear corner of the vehicle, each unit including a bracket secured to the adjacent spring and formed with spaced vertically disposed flanges having alined slots, a pair of cylinders connected with the frame, pistons operating in said cylinders and having piston rods sliding through the bottom thereof, a bar arranged between the flanges of said bracket and connected with the said piston rods, a cross pin carried by the bar, rollers mounted on the cross pin and operating in the slots in said flanges, means connecting the top and bottom ends of one cylinder of the front unit respectively with the bottom and top ends of one cylinder of the other front unit, means connecting the top and bottom end of one cylinder of the rear unit respectively with the bottom and top ends of one cylinder of the other rear unit, and means connecting the top and bottom of the other cylinder of each front unit respectively with the bottom and top of the other cylinder of the rear unit at the same side of the vehicle.

In testimony whereof I affix my signature.

CLAUDE WALTER MILLER.